No. 755,655. PATENTED MAR. 29, 1904.
T. HAMPTON.
KILN.
APPLICATION FILED JUNE 6, 1903.
NO MODEL. 6 SHEETS—SHEET 3.

No. 755,655. PATENTED MAR. 29, 1904.
T. HAMPTON.
KILN.
APPLICATION FILED JUNE 6, 1903.
NO MODEL. 6 SHEETS—SHEET 5.

No. 755,655. PATENTED MAR. 29, 1904.
T. HAMPTON.
KILN.
APPLICATION FILED JUNE 6, 1903.
NO MODEL. 6 SHEETS—SHEET 6.

Witnesses
Inventor
Thos. Hampton.
By Victor J. Evans
Attorney

No. 755,655. Patented March 29, 1904.

UNITED STATES PATENT OFFICE.

THOMAS HAMPTON, OF WEST ELIZABETH, PENNSYLVANIA.

KILN.

SPECIFICATION forming part of Letters Patent No. 755,655, dated March 29, 1904.

Application filed June 6, 1903. Serial No. 160,424. (No model.)

*To all whom it may concern:*

Be it known that I, THOMAS HAMPTON, a citizen of the United States, residing at West Elizabeth, in the county of Allegheny and State of Pennsylvania, have invented new and useful Improvements in Kilns, of which the following is a specification.

My invention relates to new and useful improvements in kilns for use in burning bricks, tiles, pipes, and other clay materials. Its object is to provide a kiln of the downdraft variety the floor of which is solid and extends over a novel arrangement of flues the outlets from which are located adjacent the center of the kiln and also along the walls thereof. Dampers are provided whereby the hot air from the furnaces arranged within the walls of the kiln may be directed to the center or to the sides of the kiln, as desired, so as to control the distribution of heat and prevent overburning of the articles within the kiln.

With the above and other objects in view the invention consists in the novel construction and combination of parts hereinafter more fully described and claimed, and illustrated in the accompanying drawings, showing the preferred form of my invention, and in which—

Figure 1:
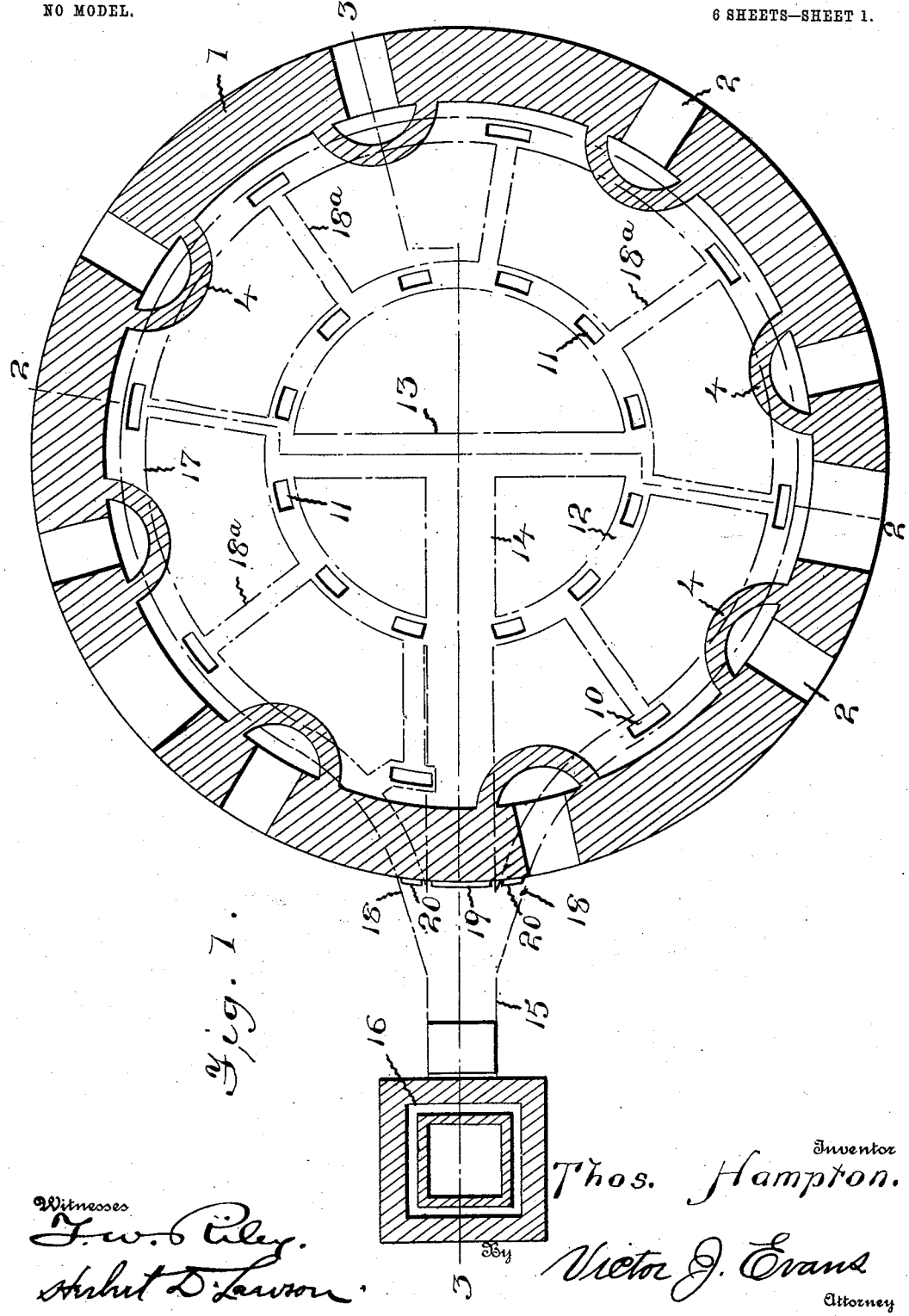
Figure 2:
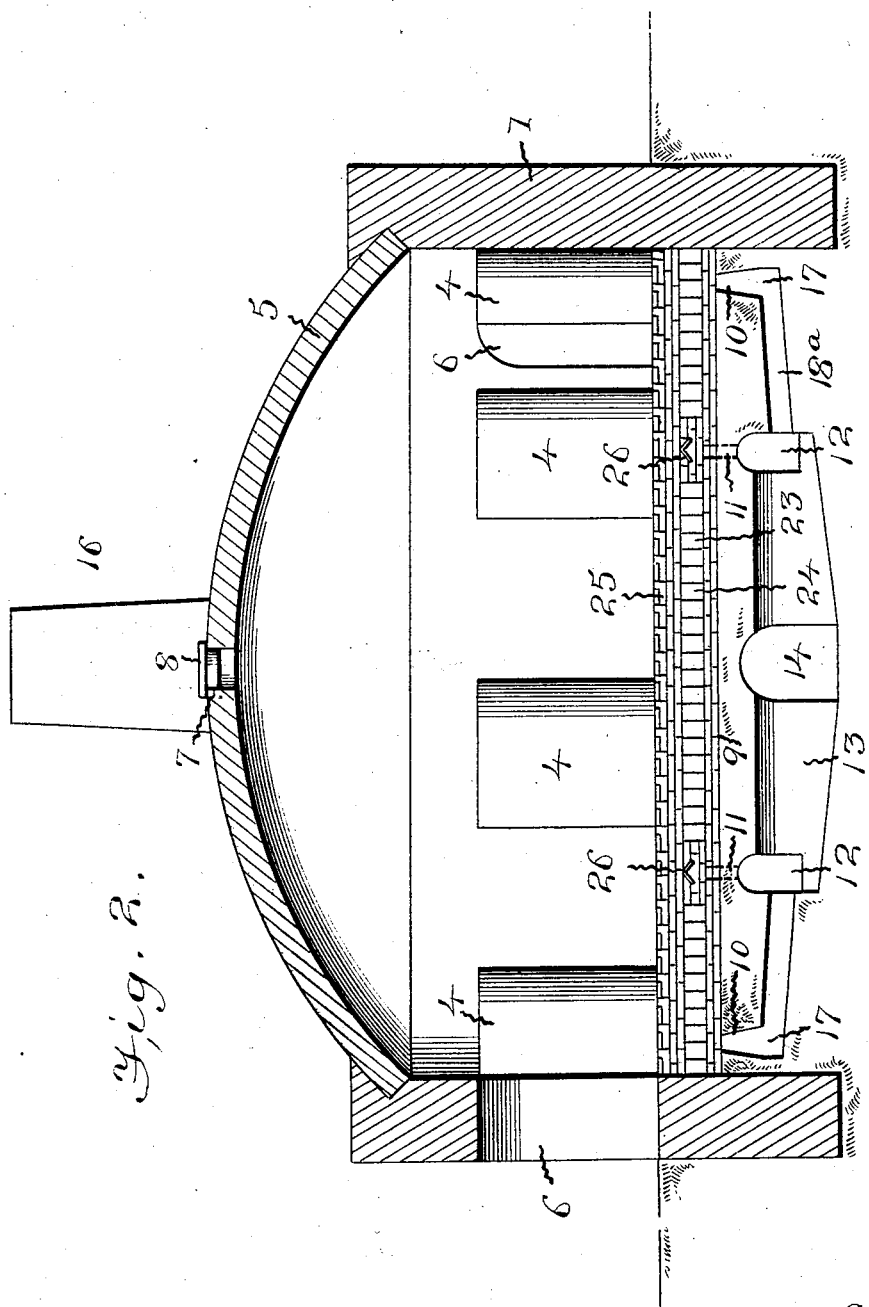
Figure 3:
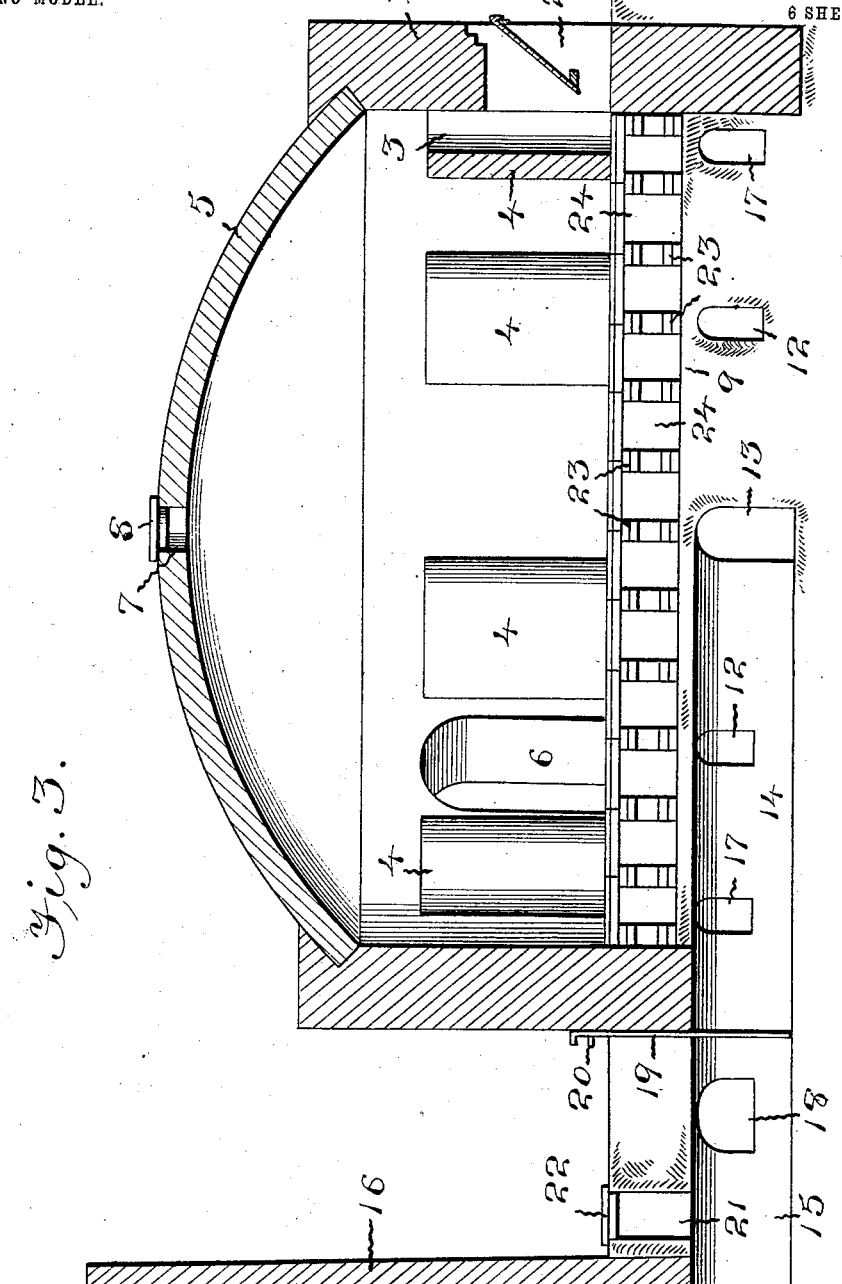
Figure 4:
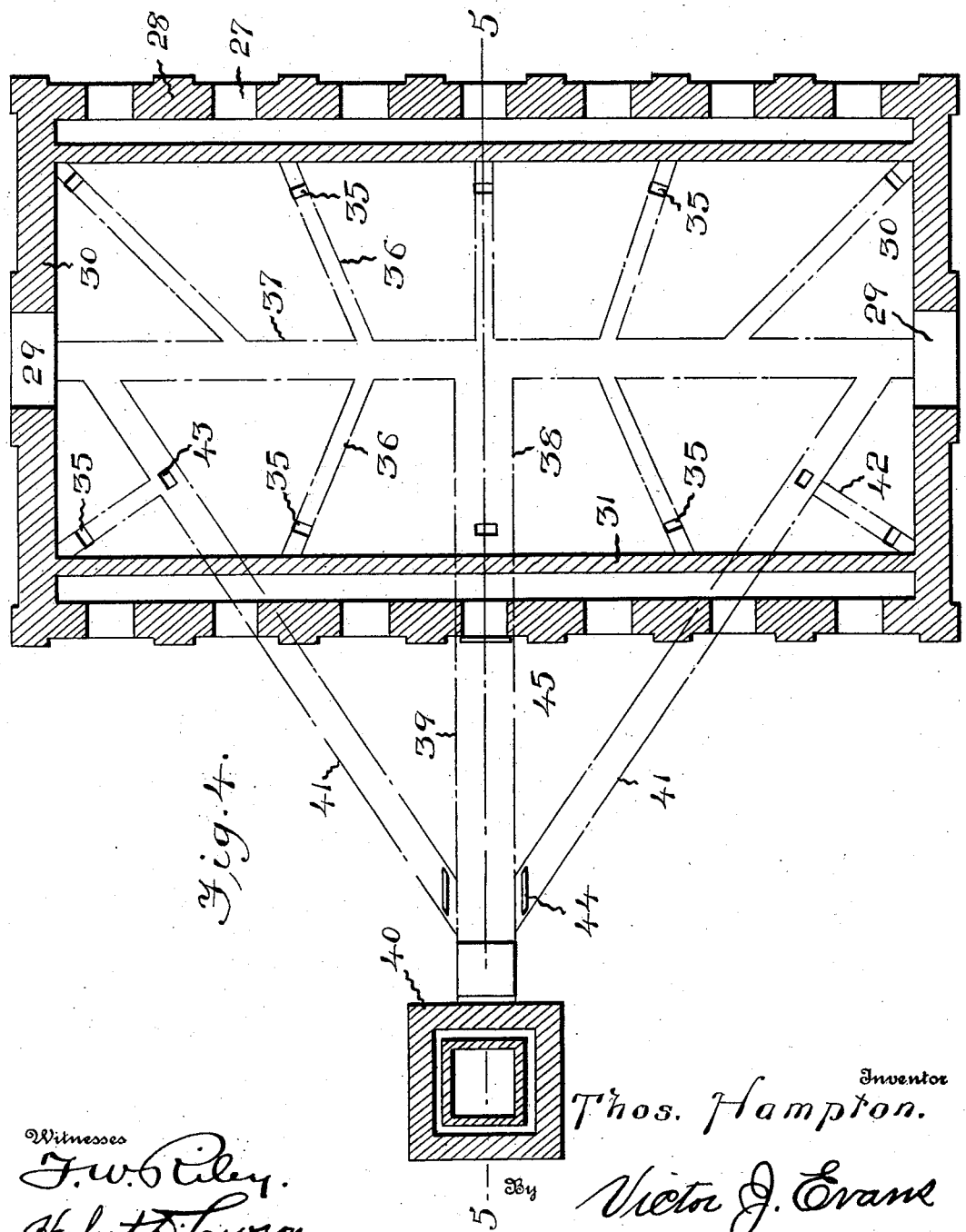
Figure 5:
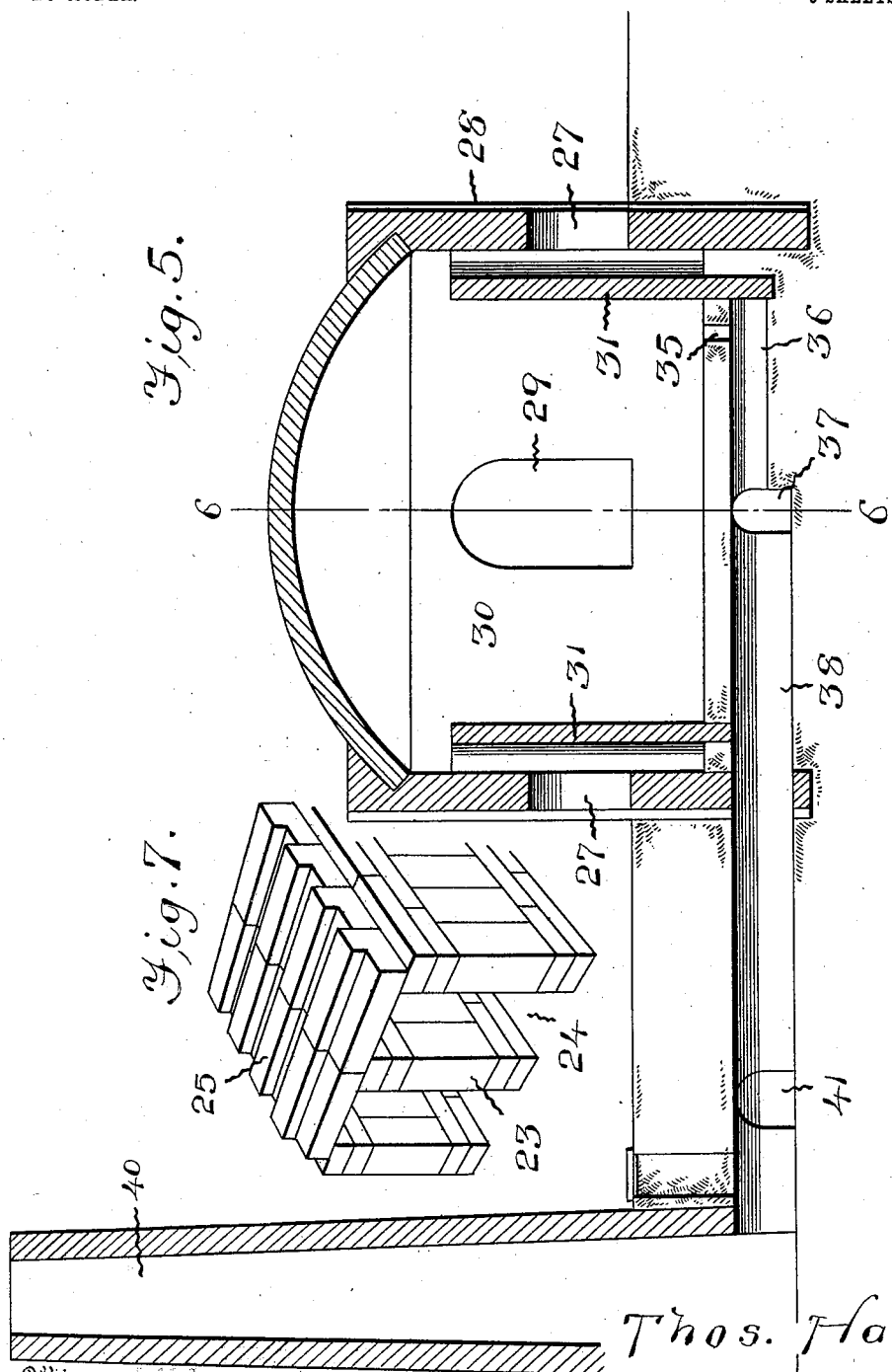
Figure 6:
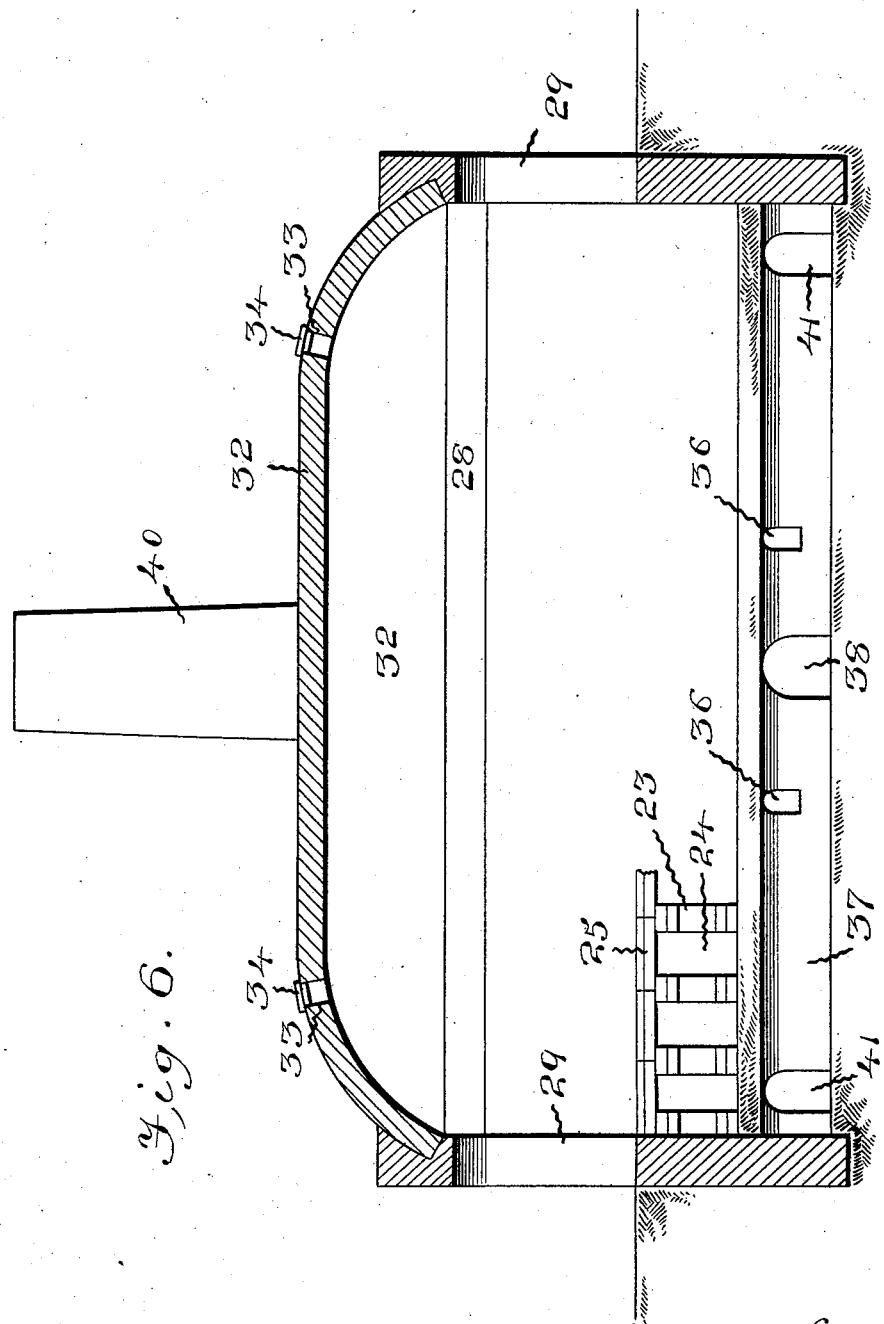

Figure 1 is a horizontal section through a circular kiln constructed in accordance with my invention. Fig. 2 is a section on line 2 2, Fig. 1, showing the bottom of the kiln provided with a perforated covering. Fig. 3 is a section on line 3 3, Fig. 1, and through the perforated covering. Fig. 4 is a horizontal section through a modified form of kiln. Fig. 5 is a section on line 5 5, Fig. 4. Fig. 6 is a section on line 6 6, Fig. 5, showing a portion of the kiln provided with a perforated bottom; and Fig. 7 is a detail view of a portion of the perforated floor which may be used in connection with the kiln.

Referring to the figures by numerals of reference, 1 is the wall of a circular kiln, said wall being constructed in any desired manner and having furnaces 2 therein at desired intervals. These furnaces communicate with combustion chambers or bags 3, formed by vertical walls 4, semicylindrical in form and extending from the floor of the kiln upward to a point adjacent the dome 5 thereof. Suitable doors 6 are arranged in the walls of the kiln and are adapted to be closed in any desired manner. An aperture 7 is formed in the dome 5 and is normally closed by means of a suitable cover 8. By means of this aperture the contents of the kiln may be readily examined. The floor 9 of the kiln is solid with the exception of inlets 10, which are located near the walls at points between the bags 3, and a series of inlets 11, arranged in a circle adjacent the center of the kiln and concentric with the wall thereof. The inner series of inlets communicates with a circular flue 12, the opposite sides of which communicate through a cross-flue 13. An outlet-flue 14 extends from the center of the cross-flue to a main flue 15, arranged outside the kiln and opening at its outer end into a suitable stack 16. The circular flue 12 is intersected by the outlet-flue 14, as shown in Figs. 1 and 3. The outer series of inlets 10 open into a circular flue 17, arranged within the floor 9 and close to the wall 1. The ends of this flue extend through the wall 1 into opposite sides of the outlet-flue 14, as shown at 18, and connecting-flues 18ª are interposed between and communicate with the two circular flues 17 and 12, one of these connecting-flues preferably being arranged adjacent each inlet 10. A damper 19 is arranged at the outer end of the outlet-flue 14, and dampers 20 are located within the ends 18 of the circular flue 17. Access may be had to the main flue 15 through a manhole 21, which is normally closed by means of a suitable cover 22.

By the novel arrangement of flues described and illustrated hot air from the furnaces 2 may be directed to any desired portion of the kiln. When it is desired to evenly distribute the heat within the kiln, the dampers 19 and 20 are opened, and the hot air from the furnace will pass outward over the upper ends of the bags 3 and into contact with the dome 5. It will then be directed downward into the adjacent inlets 10 and 11 and thence outward through the flues connected to the inlets and to the stack 16. When it is desired to direct all of the heat to the center of the kiln, the dampers 20 are closed, and it is obvious, therefore, that the heat from the furnace will only find its outlet through the inner series of inlets 11. By closing the damper 19 and opening the dampers 20 the hot gases from the furnaces will pass directly through the inlets 10 and their flue 17 to the main outlet-flue 15. Should it be desired to direct the heat to one side of the kiln only, the damper 20 adjacent said side is opened, while the other damper 20 is closed. The damper 19 is also opened. The heat will then, as is obvious, pass from the furnaces directly to the inlets at one side which communicate with the flues in which the opened dampers 18 and 19 are located.

I attach considerable importance to the fact that with this form of kiln it is unnecessary to employ a perforated or checkered floor, as the heat can be readily distributed to all parts of the kiln by means of the large flues herein provided and when arranged as in the manner described. The perforated or checkered floors for kilns are objectionable in view of the fact that they soon become clogged with particles of brick, &c., and the use of the kiln is thereby delayed until it can be properly cleaned.

When it is desired to use my improved kiln for burning hollow articles—such as pipes, tiles, &c.—a perforated floor can be arranged upon the solid floor in the manner illustrated in Figs. 2 and 3 and as shown in detail in Fig. 7. This perforated floor comprises a series of parallel walls 23, forming passages 24 therebetween and which serve to support floor-tiles 25, preferably L-shaped in form, as shown in Figs. 2 and 7. By providing an auxiliary floor such as herein described the hot air will pass downward between the floor-tiles and through the passages 24 to the inlets 10 and 11. With this construction hoods 26 are preferably arranged over the inlets 10 and 11.

While I have described the kiln as being circular in form, it will of course be understood that it may be rectangular or of any other desired shape. In Figs. 4, 5, and 6 I have shown a rectangular kiln which is constructed substantially in accord with the device above described. By referring to said figures it will be seen that furnaces 27 are arranged at desired intervals in the side walls 28 of the kiln, and doors 29 are formed within the end walls 30 thereof. Walls 31 are arranged within the kiln upon the floor thereof and adjacent side walls and extend from one end to the other of the kiln. These inner walls 31 form combustion chambers or bags for the reception of the hot air and gases from the furnaces and serve to direct the hot products upward against the dome 32 of the kiln. This dome is provided with apertures 33 having suitable closures 34. Inlets 35 are arranged adjacent the walls 31 and communicate, through flues 36, with a cross-flue 37, extending longitudinally of the kiln. An outlet-flue 38 serves to connect the central portion of the cross-flue 37 with the main flue 39, which opens into a stack 40. Side flues 41 extend from the main flue 39 to opposite ends of the cross-flue 37. If desired, one or more of the inlets 35 may be connected to the side flues 41 by means of flues 42. Inlets 43, similar to the inlets 35, may, if desired, open into the side flues 41. Dampers 44 are arranged within the side flues adjacent their points of connection with the main flue 39, and a damper 45 is also arranged in said main flue. It will be understood that by the proper manipulation of these flues the currents of hot air from the furnaces 27 may be directed to desired portions of the kiln. In view of the fact that this kiln is long and narrow in form it is unnecessary to provide inlets adjacent the center thereof, although, if desired, they could be arranged above the flue 37. While this form of kiln is also provided with a solid floor, it is obvious that a perforated floor may also be used in connection therewith. In Fig. 6 I have shown a portion of the perforated floor in position, the same being constructed in the same manner as that hereinbefore described and as illustrated in Figs. 2, 3, and 7.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In a kiln, the combination with the walls and dome; of furnaces within the walls, bags adjacent the furnaces, and a floor having inlets between adjoining bags, a cross-flue within the floor and communicating with the inlets, an outlet-flue communicating with the inlets and cross-flue, a main flue, and means for closing communication between the said main flue and the inlets and cross-flue.

2. In a kiln, the combination with the walls and dome; of furnaces within the walls, bags adjacent the furnaces, and a floor having inlets intermediate the bags, a cross-flue 13 communicating with the inlets and an outlet-flue 14 communicating with the inlets and cross-flue, and a stack removed from the kiln and having a main flue extending therefrom, said main flue communicating with the outlet-flue and having flues extending from opposite sides thereof to the inlets and communicating with the cross-flue.

3. In a kiln, the combination with the walls and dome; of furnaces within the walls, bags adjacent the furnaces; a solid floor having inlets intermediate the bags, concentric flues into the outer one of which opens the inlets, inlets in the inner concentric flue, a cross-flue communicating at its ends with opposite sides of the inner concentric flue, connecting-flues interposed between the concentric flues, an outlet-flue extending from the cross-flue and intersecting the inner concentric flue; a stack removed from the kiln and having a main flue extending therefrom and communicating with the outlet-flue 14 and at opposite sides with the ends of the outer concentric flue, and dampers within said ends and in the outlet-flue 14.

4. In a kiln, the combination with the walls and dome thereof; of furnaces within the walls, bags adjacent the furnaces, a solid floor having inlets intermediate the bags, concentric flues into the outer one of which opens the inlets, inlets in the inner concentric flue, a cross-flue communicating at its ends with opposite sides of the inner concentric flue, connecting-flues interposed between the concentric flues, an outlet-flue extending from the cross-flue and intersecting the inner concentric flue, a stack removed from the kiln and having a main flue extending therefrom and communicating with the outlet-flue and at opposite sides with the ends of the outer concentric flue, dampers within said ends and in the outlet-flue, and an auxiliary perforated floor comprising walls forming passages therebetween and tiles upon the walls.

In testimony whereof I affix my signature in presence of two witnesses.

THOMAS HAMPTON.

Witnesses:
   JOHN S. SPEER,
   ARCHIBALD G. BOAL.